United States Patent [19]

Mitani

[11] Patent Number: 5,254,137
[45] Date of Patent: Oct. 19, 1993

[54] METHOD OF PRODUCING CHIP-TYPE SOLID-ELECTROLYTE CAPACITOR

[75] Inventor: Toshiyuki Mitani, Tokyo, Japan

[73] Assignee: NEC Corporation, Japan

[21] Appl. No.: 783,982

[22] Filed: Oct. 29, 1991

[30] Foreign Application Priority Data

Oct. 29, 1990 [JP] Japan .................. 2-291536

[51] Int. Cl.$^5$ .............................................. B21F 41/00
[52] U.S. Cl. ............................ 29/25.03; 361/540; 148/DIG. 138; 148/DIG. 93; 437/977
[58] Field of Search ................ 29/25.03; 437/977; 361/402, 540; 148/DIG. 138

[56] References Cited

U.S. PATENT DOCUMENTS

| | | | |
|---|---|---|---|
| 3,855,505 | 12/1974 | Karlik, Jr. et al. | 29/25.03 |
| 4,093,972 | 6/1978 | Voyles | 29/25.03 |
| 4,561,041 | 12/1985 | Crowley, Jr. et al. | 361/541 |
| 4,571,664 | 2/1986 | Hyland | 29/25.03 |
| 4,827,328 | 5/1989 | Ozawa et al. | 361/402 |
| 5,036,434 | 7/1991 | Kobayashi | 29/25.03 |
| 5,142,452 | 8/1992 | Saiki | 29/25.03 |

FOREIGN PATENT DOCUMENTS 0263424  10/1990  Japan .................. 29/25.03

Primary Examiner—Brian E. Hearn
Assistant Examiner—Tuan Nguyen
Attorney, Agent, or Firm—Ostrolenk, Faber, Gerb & Soffen

[57] ABSTRACT

Disclosed is a method of producing a chip-type solid-electrolyte capacitor, in which the surface of a sheathing resin layer formed on an anode body is roughened by forming an irregularity thereon, and plated metal layers are formed on the surface thus roughened for an anode and cathode use. The metal layers are strongly adhered on the roughened surface. The surface-irregularity of the sheathing resin layer is produced by blasting hard particle material made of, for example, alumina or glass using a sandblast machine, or by irradiating a laser beam such as the YAG laser beam or the like.

4 Claims, 2 Drawing Sheets

ND OF THE INVENTION

1. Field of the Invention

This invention relates to a method of producing a chip-type solid-electrolyte capacitor.

2. Description of the Prior Art

Previously, various chip-type solid-electrolyte capacitors have been proposed. An example of them is shown in FIG. 1, which is manufactured by such a method that an anode terminal 22 and a cathode terminal 23 are respectively connected to a capacitor body 21 which is fabricated by a known method, and a resin layer 24 is formed by the transfer molding technique on the surface of the capacitor body 21 for the sheathing purpose as well as the outer end portions of the anode terminal 22 and the cathode terminal 23 are respectively protruded from the sheathing resin layer 24.

With the electrolyte capacitor as structured as above, since the leading section of each of the anode terminal 22 and the cathode terminal 23 for protruding is to be contained into the sheathing resin layer 24 as shown in FIG. 1, the sheathing resin layer 24 is unavoidably large in volume, arising such a problem that compactization is extremely difficult. Then, in order to overcome this problem, a chip-type solid-electrolyte capacitor as shown in FIG. 2 has been proposed.

In FIG. 2, a resin layer 33 is provided for the sheathing purpose on the surface of an anode body 31 having an anode lead 32 vertically inserted thereinto excepting the end surface of the anode body 31 opposite to the end surface where the anode lead 32 is inserted. On the surface of the end portion of the anode body 31 on the side of the anode lead 32 are laminated an electroconductive layer 34, a plated metal layer 35 and a solder layer 36 so as to contact respectively with the anode lead 32. On the surface of the end portion of the anode body 31 on the opposite side to the anode lead 32 is formed an electroconductive layer 37 so as to contact with the surface portion of the anode body 31 where the sheathing resin layer 33 is not provided, and a plated metal layer 38 and a solder layer 39 are laminated thereon in this order. The electroconductive layer 34, the plated metal layer 35 and the solder layer 36 constitute an anode, and on the other hand, the electroconductive layer 37, the plated metal layer 38 and the solder layer 39 constitute a cathode.

In addition, in the capacitor shown in FIG. 2, such a capacitor that the electroconductive layers 34 and 37 are not formed and the plated metal layers 35 and 38 and the solder layers 36 and 39 are respectively laminatedly formed directly on the surface of the anode body 31 is known as well.

The capacitor shown in FIG. 2 is smaller in size than that shown in FIG. 1. However, it has been pointed out such a problem that when it is mounted on a circuit substrate, it is easy to be disconnected therefrom when an external force is applied.

Thus, an object of this invention is to provide a method of producing a chip-type solid-electrolyte capacitor which is small in size and yet hard to be disconnected even under the application of an external force from a circuit substrate on which it is mounted.

SUMMARY OF THE INVENTION

A method of producing a chip-type solid-electrolyte capacitor of this invention features that the surface areas of a sheathing resin layer where plated metal layers are to be coated for forming an anode and a cathode are roughened, and the plated metal layer is provided on the surface areas thus roughened. By roughening the surface of the sheathing resin layer, the contact area of the sheathing resin layer and the plated metal layers formed thereon can be increased as compared with the sheathing resin layer that is not roughened. As a result, the both layers can be strongly adhered with each other, which means that the adhesion between the capacitor thus produced and a circuit substrate on which it is to be mounted can be improved.

The roughness-depth value of a surface-irregularity formed on the sheathing resin layer is preferable to be approximately 5 to 30 μm.

In one preferred embodiment of this invention, the surface-irregularity that is to be formed on the sheathing resin layer is formed by blasting hard powder or hard particle material on the surface to be roughened using a sandblast machine. As the resin material for the sheathing resin layer, epoxy resin, silicone resin and the like are generally used, and the particle size of the hard powder or the hard particle material and the air-pressure for blasting are properly to be set in accordance with the kind of sheathing resin so that the desired surface-irregularity may be formed thereon. As the hard powder or the hard particle material to be blasted, alumina ($Al_2O_3$) powder or glass beads powder is preferable. The average particle size thereof is preferable to be approximately 40 to 100 μm, the most preferable one is of approximately 50 μm. The air-pressure to be used for blasting is preferable to be approximately 4 to 7 kg/cm$^2$, the best one is of approximately 6 kg/cm$^2$.

The surface-irregularity can be formed by irradiating a laser beam onto the surface areas to be roughened of the sheathing resin layer. In this case, the spot diameter, the output and other factors of a laser beam to be used are adjusted in accordance with the kind of the sheathing resin in order to form the desired irregularity thereon. As the laser to be used, an ytterium aluminium garnet (YAG) laser, carbon dioxide ($CO_2$) gas laser or excimer laser is preferable. The spot diameter of a laser beam to be used is preferable to be approximately 30 to 100 μm, the best one is of approximately 50 μm. Preferable output and frequency of a laser beam to be used is approximately 0.2 Joule and 100 pulses/sec, respectively.

BRIEF DESCRIPTION OF THE DRAWINGS

In which, FIG. 3 is a cross-sectional view showing the state that an oxide film, an electrolyte layer, a cathode electroconductive layer, and a sheathing resin layer are formed on the surface of an anode body;

FIG. 4 is a cross-sectional view showing the state that on the both end portions of the anode body shown in FIG. 3, a plated metal layer and a solder layer are formed on the sheathing resin layer;

FIG. 5 shows an external appearance of a chip-type solid-electrolyte capacitor produced as shown in FIGS. 3 and 4.

DESCRIPTION OF THE PREFERRED EMBODIMENTS

Figure 1:
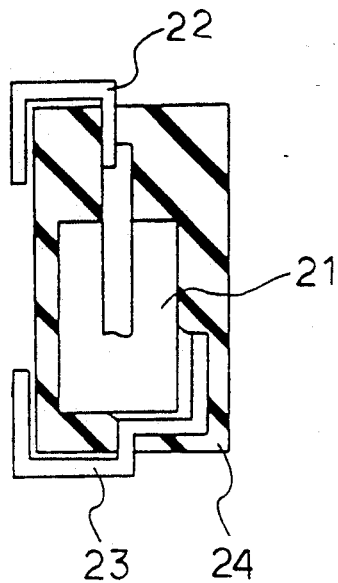
FIGS. 1 and 2 each is a cross-sectional view of a chip-type solid-electrolyte capacitor produced by a method of the prior art.
Figure 2:
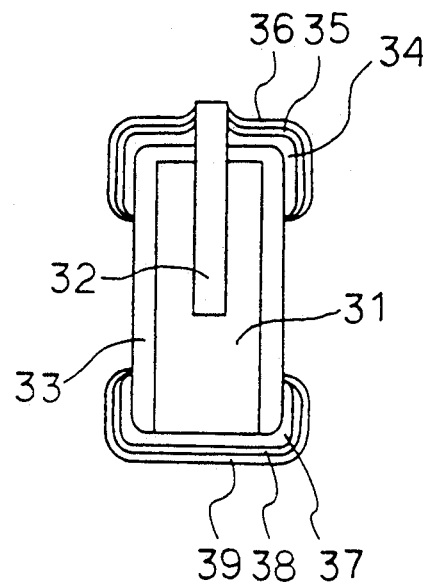
Figure 3:
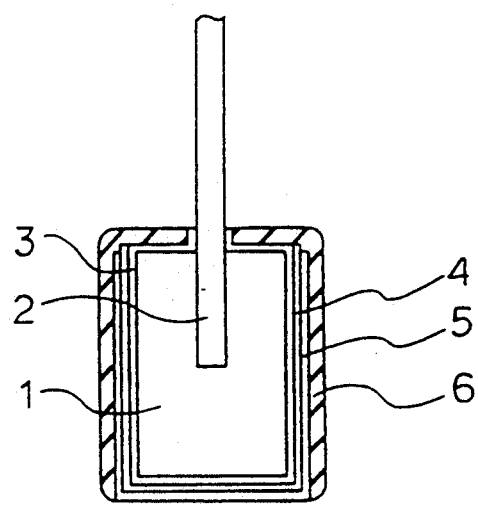
FIGS. 3 to 5 show a chip-type solid-electrolyte capacitor to be produced by a method according to one embodiment of this invention.
Figure 4:
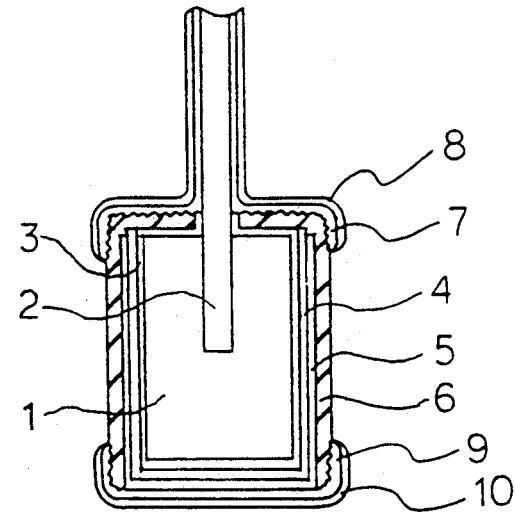
Figure 5:
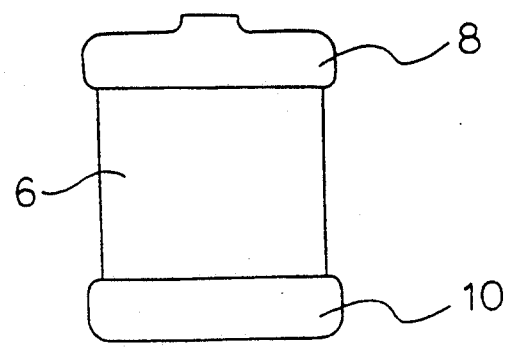

One preferred embodiment of this invention will be described below referring to FIGS. 3 to 5.

First, powdered tantalum (Ta) is pressure-molded and the mold thus obtained is sintered under the vacuum atmospheric condition at an elevated temperature thereby to prepare an anode body 1 in which an anode lead 2 is insertedly formed.

Next, the anode body 1 thus prepared is dipped into a phosphoric acid solution under the application of a voltage of 100 V for anodic oxidation. Thus, an oxide film 3 made of tantalum oxide ($Ta_2O_5$) is formed on the surface of the anode body 1.

The anode body 1 thus having the oxide film 3 formed thereon is dipped into a manganese nitride solution thereby to adhere manganese nitride onto the surface of the anode body 1 and heated in the atmosphere at a temperature of 200° to 300° C. So heated that the manganese nitride being adhered onto the peripheral surface thereof is pyrolyzed to produce manganese dioxide ($MnO_2$) for covering the anode body 1. By repeating this dipping and heating process several times, the manganese dioxide layer is grown up to a predetermined thickness. Thus, a electrolyte layer 4 composed of manganese dioxide is formed on the surface of the anode body 1 as shown in FIG. 3.

Next, the anode body 1 thus having the electrolyte layer 4 formed is dipped into a carbon paste and heated in the atmosphere at 150° to 200° C. to bake the carbon onto the surface of the electrolyte layer 4. Then, the anode body 1 thus processed is dipped into a silver paste and heated in the atmosphere at 150° to 200° C. to bake the silver onto the surface thereof. So treated that a cathode electroconductive body 5 composed of silver and carbon is formed on the surface of the electrolyte layer 4 as shown in FIG. 3.

Thereafter, epoxy resin powder is provided by the electrostatic adhesion technique on the surface of the anode body 1 excepting the end surface of the anode body 1 opposite to the surface from which the anode lead 2 is protruded and on the surface of the anode lead 2 protruded from the anode body 1, and heated in the atmosphere at 100° to 200° C. for a time period of 30 to 120 minutes, thereby melting and curring the powdered epoxy resin thus provided. Thus, a sheathing resin layer 6 is formed on the anode body 1. In this case, as shown in FIG. 3, the anode lead 2 is protruded from the sheathing resin layer 6 and the cathode electroconductive layer 5 is exposed to the atmosphere on the end surface of the anode body 1 opposite to the surface from which the anode lead 2 is protruded.

Next, using a straight hydraulic sandblast machine, powdered alumina particles having the average particle size of 40 to 100 μm are blasted at a air-pressure of 4 to 6 kg/cm² on the predetermined areas of the surface of the sheathing resin layer 6 where the anode and the cathode are formed in the latter process in order to roughen the surfaces of them. Out of these surface areas, the surface areas where the anode is to be formed are the end surface of the anode body 1 where the anode lead 2 is insertedly provided and the side surface area of the anode body 1 continuing to that end surface, and on the other hand, the surface areas were the cathode is to be formed are the end surface of the anode body 1 opposite to the end surface where the anode lead 2 is provided and the side surface area of the anode body 1 continuing to that end surface.

Next, a butyl acetate solution of palladium amine compound is coated onto the roughened surface areas thus formed of the sheathing resin layer 6 and heated in the atmosphere at 200° C. for 30 minutes for pyrolyzing the palladium amine compound. Thus, the palladium particles are adhesively provided on the roughened surface areas of the sheathing resin layer 6.

The anode body 1 including the anode lead 2 is then dipped into an electroless nickel plating solution at 65° C. for 40 minutes to form a metal layer 7 and 9 respectively in the roughened surface areas of the sheathing resin layer 6. In this case, the thickness of each of the layers 7 and 9 ranges approximately from 4 to 5 μm.

After formation of the metal layers 7 and 9, a solder layer 8 and 10 are formed respectively on the metal layers 7 and 9 by any method that is known. Finally, the anode lead 2 is cut at a predetermined length, so that the chip-type solid-electrolyte capacitor as shown in FIG. 5 can be obtained.

In order to verify the effect of this invention, chip-type solid-electrolyte capacitors were produced according to this embodiment of the invention and prior art chip-type solid-electrolyte capacitors were produced by the same method as this embodiment excepting that the prior art ones have the sheathing resin layer 6 with no roughened surface area. Then both of the capacitors were mounted on respective circuit substrates and subjected to the measurement of the adhesions to the circuit substrates for the comparative purpose. The results obtained are shown in Table 1. In this comparison, ten samples are prepared for each of the both capacitors and measured. The data shown in Table 1 are the mean values of the measurements of respective ten samples.

TABLE 1

|  | Adhesive force |
|---|---|
| Capacitor of prior art | 0.6 kg |
| Capacitor of this invention | 2.5 kg |

Table 1 reveals that the chip-type solid-electrolyte capacitors produced according to this invention are remarkably large in adhesive force to the circuit substrate as compared with those according to the prior art.

In this embodiment, a sandblast machine is used for making irregularity on the surface of the sheathing resin layer 6, but it is not limited thereto, a laser such as a yttrium aluminium garnet (YAG) laser can be used for this purpose. With the YAG laser, similar irregularities can be formed by applying a laser beam under such conditions as a spot diameter of 50 μm, laser output of 0.2 Joule and a frequency of 100 pulses/sec.

Also, as the metal catalyst to be used in forming the plated metal layers 7 and 9, a copper system one may be used instead of the palladium. In addition, any method that is known other than the electroless nickel plating method can be employed.

What is claimed is:

1. A method of producing a chip-type, solid-electrolyte capacitor comprising the steps of:
   providing a solid-electrolyte capacitor element having opposed top and bottom surfaces and a side surface extending therebetween;

forming a sheathing resin layer on said top surface and said side surface of said capacitor element;

roughening a surface area of said sheathing resin layer by using a laser beam under such irradiation concentrations as to be approximately 30 to 100 μm in spot diameter and approximately 0.2 Joule in output;

forming a plated metal layer on said surface area after roughening thereof, and forming a solder layer on said plated metal layer.

2. A method of producing a chip-type, solid-electrolyte capacitor comprising the steps of:

providing a solid-electrolyte capacitor element having opposed top and bottom ends and a side surface extending therebetween;

forming a sheathing resin layer on said top end and said side surface of said capacitor element;

roughening selected side and top surface regions of said sheathing resin layer by using a laser beam, said top surface region being located on said top end of said capacitor element and said selected side surface regions being located on said side surface of said capacitor element, and one of said selected side surface regions being positioned next to said top surface region and another one of said selected side surface regions being placed adjacent to said bottom end of said capacitor element;

forming a first plate metal layer on said top surface region after roughening thereof and on said one of said selected side surface regions after roughening thereof to provide an anode electrode;

forming a second plated metal layer on said bottom end and on said another one of said selected side surface regions after roughening thereof to provide a cathode electrode; and forming solder layers on said first and second plated metal layers, respectively.

3. The method of producing a chip-type solid-electrolyte capacitor as claimed in claim 2, wherein said laser beam is used under such irradiation conditions as to be approximately 30 to 100 μm in spot diameter and to be approximately 0.2 Joule in output.

4. The method of producing a chip-type solid-electrolyte capacitor as claimed in claim 3, wherein said spot diameter is approximately 50 μm and said laser beam is generated by a yttrium aluminum garnet (YAG) laser operating at a frequency of approximately 100 pulses/sec.

* * * * *